US009398318B1

(12) United States Patent
Leske et al.

(10) Patent No.: US 9,398,318 B1
(45) Date of Patent: Jul. 19, 2016

(54) PROVIDING SECURE VIDEO CONFERENCING

(71) Applicant: Google Inc., Mountain View, CA (US)

(72) Inventors: Matthew John Leske, Stockholm (SE); Gang Ji, Bothell, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/259,088

(22) Filed: Apr. 22, 2014

Related U.S. Application Data

(60) Provisional application No. 61/978,116, filed on Apr. 10, 2014.

(51) Int. Cl.
  *H04L 29/06* (2006.01)
  *H04N 21/2347* (2011.01)
(52) U.S. Cl.
  CPC .................................. *H04N 21/2347* (2013.01)
(58) Field of Classification Search
  None
  See application file for complete search history.

(56) References Cited

U.S. PATENT DOCUMENTS

| 7,613,182 | B2* | 11/2009 | Lecomte | H04N 7/1675 360/60 |
| 2003/0035543 | A1* | 2/2003 | Gillon | H04N 7/1675 380/270 |
| 2003/0223583 | A1* | 12/2003 | Stirling | G03B 21/00 380/216 |
| 2007/0189531 | A1* | 8/2007 | Lecomte | H04N 7/1675 380/237 |
| 2008/0069350 | A1* | 3/2008 | Reinoso | H04N 7/1675 380/200 |
| 2012/0246462 | A1* | 9/2012 | Moroney | H04L 63/10 713/151 |
| 2013/0219178 | A1* | 8/2013 | Xiques | H04L 9/083 713/168 |
| 2014/0040623 | A1* | 2/2014 | Conus | H04N 21/222 713/176 |

OTHER PUBLICATIONS

Gentry, Craig; Hevia, Alejandro; Jain, Ravi; Kawahara, Toshiro; Ramzan, Zulfikar. End-to-End Security in the Presence of Intelligent Data Adapting Proxies: The Case of Authenticating Transcoded Streaming Media. IEEE Journal on Selected Areas in Communications. vol. 23, Issue: 2. http://ieeexplore.ieee.org/stamp/stamp.jsp?tp=&arnumber=1391050.*

Iqbal, Razib; Shahabuddin, Sharmeen; Shirmohammadi, Shervin. Compressed-Domain Spatial Adaptation Resilient Perceptual Encryption of Live H.264 Video. 2010 10th International Conference on Information Sciences Signal Processing and their Applications (ISSPA). http://ieeexplore.ieee.org/stamp/stamp.jsp?tp=&arnumber=5605442.*

* cited by examiner

*Primary Examiner* — Jeremiah Avery
(74) *Attorney, Agent, or Firm* — IP Spring

(57) ABSTRACT

Implementations generally relate to providing secure video conferencing. In some implementations, a method includes performing a first encryption of a video stream, wherein the video stream has a first encryption layer from the first encryption. The method further includes performing a second encryption of the video stream, wherein the video stream has a second encryption layer from the second encryption. The method further includes enabling one or more remote nodes to decrypt the second encryption layer. The method further includes enabling one or more end-user nodes to decrypt the first encryption layer.

20 Claims, 4 Drawing Sheets

PROVIDING SECURE VIDEO CONFERENCING

CROSS-REFERENCE TO RELATED APPLICATION

This Application claims the benefit of U.S. Provisional Patent Application No. 61/978,116, filed Apr. 10, 2014, the contents of which are all incorporated herein by reference in their entirety.

BACKGROUND

Video conferencing is often used in business settings and enables participants to share content with each other in real-time across geographically dispersed locations. A communication device at each location typically uses a video camera and microphone to send video and audio streams, and uses a video monitor and speaker to play received video and audio streams. The communication devices maintain a data linkage via a network and transmit video and audio streams in real-time across the network from one location to another.

SUMMARY

Implementations generally relate to providing secure video conferencing. In some implementations, a method includes performing a first encryption of a video stream, where the video stream has a first encryption layer from the first encryption. The method further includes performing a second encryption of the video stream, where the video stream has a second encryption layer from the second encryption. The method further includes enabling one or more remote nodes to decrypt the second encryption layer. The method further includes enabling one or more end-user nodes to decrypt the first encryption layer.

With further regard to the method, in some implementations, the video stream is a live video stream. In some implementations, the first encryption and the second encryption are performed at a source node in a network system. In some implementations, the one or more remote nodes are not able to decrypt the first encryption layer. In some implementations, the method further includes causing the one or more remote nodes to replicate the video stream after the second encryption layer is decrypted. In some implementations, the method further includes causing the one or more remote nodes to fan-out the video stream after the second encryption layer is decrypted. In some implementations, the method further includes generating a second key associated with the second encryption, and sending the second key to the one or more remote nodes. In some implementations, the method further includes generating a first key associated with the first encryption, and sending the first key to the one or more end-user nodes. In some implementations, the method further includes sending the second key from the source node to the one or more remote nodes via secure channels, and enabling the one or more remote nodes to decrypt the second encryption layer using the second key. In some implementations, the method further includes sending the first key from the source node to the one or more end-user nodes via a secure channel, and enabling the end-user node to decrypt the first encryption layer using the first key.

In some implementations, a method includes performing a first encryption of a video stream, where the video stream has a first encryption layer from the first encryption, and where the video stream is a live video stream. The method further includes performing a second encryption of the video stream, where the video stream has a second encryption layer from the second encryption, and where the first encryption and the second encryption are performed at a source node in a network system. The method further includes enabling one or more remote nodes to decrypt the second encryption layer. The method further includes causing the one or more remote nodes to replicate the video stream after the second encryption layer is decrypted. The method further includes enabling one or more end-user nodes to decrypt the first encryption layer.

In some implementations, a system includes one or more processors, and logic encoded in one or more tangible media for execution by the one or more processors. When executed, the logic is operable to perform operations including: performing a first encryption of a video stream, where the video stream has a first encryption layer from the first encryption; performing a second encryption of the video stream, where the video stream has a second encryption layer from the second encryption; enabling one or more remote nodes to decrypt the second encryption layer; and enabling one or more end-user nodes to decrypt the first encryption layer.

With further regard to the system, in some implementations, the video stream is a live video stream. In some implementations, the first encryption and the second encryption are performed at a source node in a network system. In some implementations, the one or more remote nodes are not able to decrypt the first encryption layer. In some implementations, the logic when executed is further operable to perform operations including causing the one or more remote nodes to replicate the video stream after the second encryption layer is decrypted. In some implementations, the logic when executed is further operable to perform operations including causing the one or more remote nodes to fan-out the video stream after the second encryption layer is decrypted. In some implementations, the logic when executed is further operable to perform operations including generating a second key associated with the second encryption, and sending the second key to the one or more remote nodes. In some implementations, the logic when executed is further operable to perform operations including generating a first key associated with the first encryption, and sending the first key to the one or more end-user nodes. In some implementations, the logic when executed is further operable to perform operations including sending the second key from the source node to the one or more remote nodes via secure channels, and enabling the one or more remote nodes to decrypt the second encryption layer using the second key.

DETAILED DESCRIPTION

Implementations described herein provide secure video conferencing in a network system. In various implementations, a system performs a first encryption of a video stream such as a live video stream, where the video stream has a first encryption layer from the first encryption. The system then replicates the video stream. The system then performs a second encryption of the video stream, where the video stream has a second encryption layer from the second encryption. In various implementations, the system performs the first encryption and the second encryption at the same source node in the network system. The system then fans-out the twice-encrypted video stream with the two layers of encryptions to one or more remote nodes.

The system then enables one or more remote nodes to decrypt the second encryption layer, where the remote nodes are not able to decrypt the first encryption layer. In some implementations, the system causes the one or more remote nodes to replicate and securely fan-out the video stream after the second encryption layer is decrypted. The system then causes the remote nodes to send the video stream with the first layer of encryption to one or more end-user nodes. The system then enables the end-user nodes to decrypt the first encryption layer. Implementations securely deliver and maintain confidential information across the network system.

Figure 1:
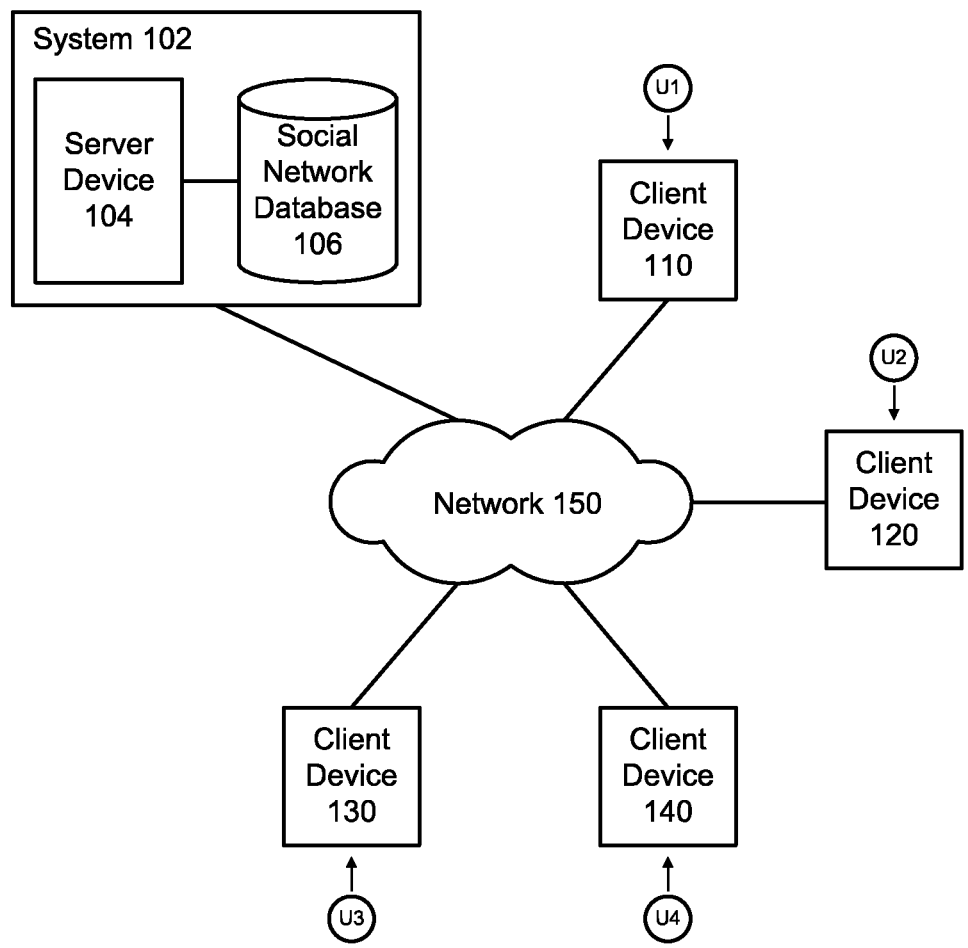
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other in a multi-user video conference, where respective client devices 110, 120, 130, and 140 transmit media streams to each other.

Figure 2:
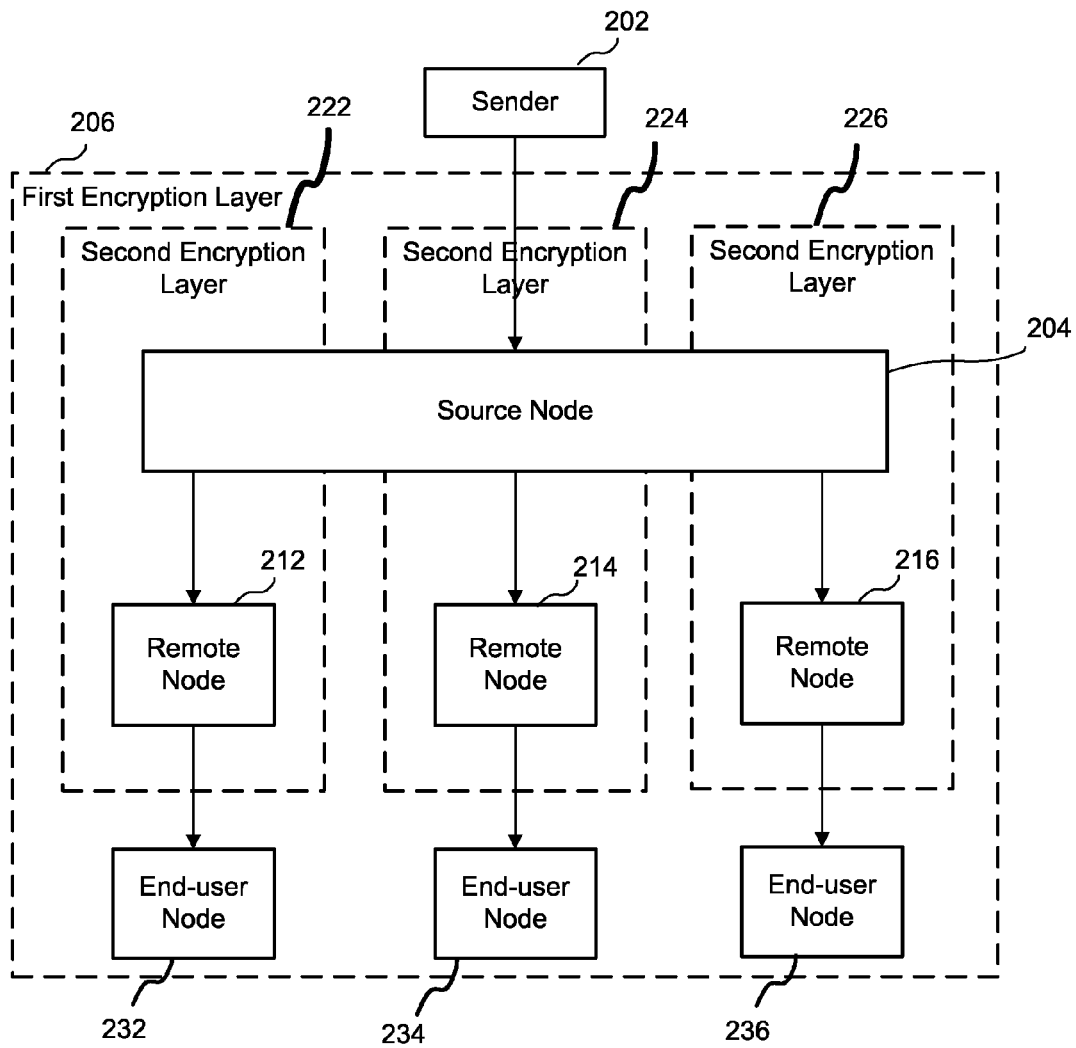
FIG. 2 illustrates an example simplified block diagram a multiple-tier fan-out scheme, according to some implementations.

FIG. 2 illustrates an example simplified block diagram a multiple-tier fan-out scheme, according to some implementations. As shown, a sender 202 may be a presenter, where the presenter presents to the employees of a corporation, or to members of an organization, etc. For example, sender 202 may present in a live video stream to millions of employees around the world. Various implementations are described herein in the context of live video streams. These implementations and other may also apply to other types of media streams such as recorded video stream, live audio streams, recorded audio streams, presentation slides and/or related media content, etc.

As described in more detail below, system 102 (FIG. 1) encrypts the content of the video stream twice at a first node 204. First node 204 may also be referred to as a source node 204. The source node 204 may also be referred to as a first tier node in the encryption scheme. As described in more detail below in connection with FIG. 2, the first encryption results in a first encryption layer 206.

System 102 then replicates the video stream to be sent to multiple remote nodes 212, 214, and 216 residing in various locations around the world. For example, the first or source node 204 may reside in the United States, remote node 212 may reside in South Africa, remote node 214 may reside in Sweden, and remote node 216 may reside in China. The particular locations such as country, city, etc., may vary and will depend on the particular implementations. Also, the particular locations within a city may vary depending on the particular implementations. For example, remote nodes may reside in universities, and/or Internet service providers (ISP), hosting companies, etc.

For ease of illustration, three remote nodes are shown. The actual number of remote nodes may vary, depending on the particular implementation. For example, source node 204 may perform a fan-out of 1000, or etc., cascading to many remote nodes. Also, the number of remote nodes in a given country may vary, depending on the particular implementation.

Remote nodes 212, 214, and 216 may also be referred to as content delivery network (CDN) points or CDN nodes 212, 214, and 216. Remote nodes 212, 214, and 216 may also be referred to as second tier nodes in the encryption scheme, where system 102 performs a second encryption. As described in more detail below in connection with FIG. 2, the second encryption results in second encryption layers 222, 224, and 226 for each of remote nodes 212, 214, and 216. The second tier of nodes enables encrypted media content to be distributed to large remote teams without using expensive dedicated or trusted infrastructure.

In various implementations, system 102 performs the first and second encryptions at source node 204. After creating first encryption layer 206 and second encryption layers 222, 224, and 226, system 102 sends (e.g., fans-out) the twice encrypted video streams to remote nodes 212, 214, and 216.

As described in detail below, each remote node 212, 214, and 216 decrypts the second encryption layer. In various implementations, remote nodes 212, 214, and 216 leave the first encryption layer intact (e.g., not decrypted). Each remote node 212, 214, and 216 then replicates and performs a fan-out of the video stream (e.g., a fan-out of 1000, etc.). As shown in FIG. 2, system 102 causes remote nodes 212, 214, an 216 to send the video stream to respective end-user nodes 232, 234, and 236. End-user nodes 232, 234, and 236 may also be referred to as receiver nodes 232, 234, and 236.

For ease of illustration, three end-user nodes 232, 234, and 236 are shown. Each end-user node may represent multiple end-user nodes (e.g., hundreds, thousands, etc.). The video stream may ultimately reach millions of geographically diverse viewers via the multiple tiers of nodes.

For ease of illustration, implementations are described herein in the context of a single media stream (e.g., a live video stream). These implementations and other also apply to multiple media streams. In some implementations, system 102 creates a unique first encryption layer for each different media stream. System 102 also creates a unique second encryption layer for each different media stream and for each different remote node. This provides additional security for each media stream. By using a per stream encryption key, the distribution of the content across the content of various remote nodes can be guaranteed to be safe, while still enabling the broadcast infrastructure to scale to many users.

Figure 3:
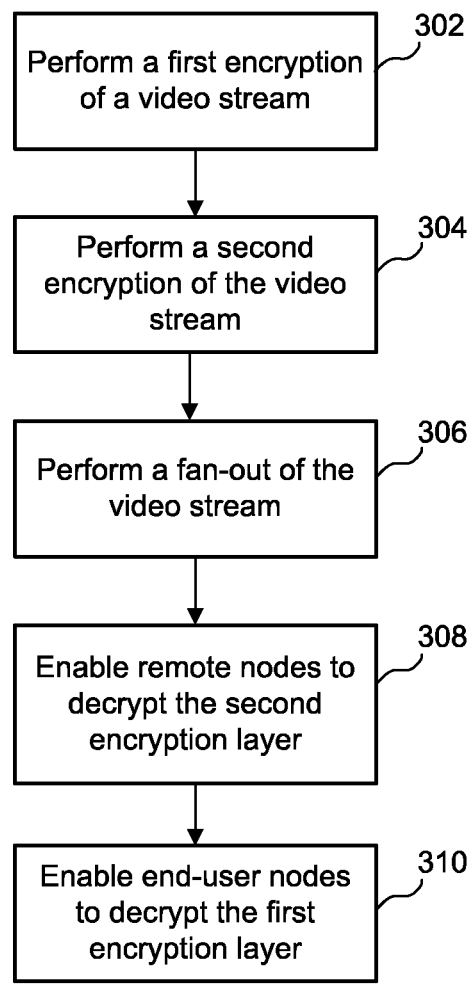
FIG. 3 illustrates an example simplified flow diagram for providing secure video conferencing, according to some implementations.

FIG. 3 illustrates an example simplified flow diagram for providing secure video conferencing, according to some implementations. Referring to FIGS. 2 and 3, a method is initiated in block 302, where system 102 performs a first encryption of a video stream. In various implementations, the video stream is a live video stream provided by sender 202. As a result, the video stream has first encryption layer 206 from the first encryption. In various implementations, first encryption layer 206 may also be referred to as base encryption layer 206, or a lower encryption layer 206.

In various implementations, system 102 generates a first key associated with the first encryption. System 102 then sends the first key from source node 204 to end-user nodes 232, 234, and 236. In some implementations, system 102 sends the first key from source node 204 to end-user nodes 232, 234, and 236 via a secure channel. In some implementations, the first key is same/common key that is sent to all end-user nodes 232, 234, and 236.

In block 304, system 102 performs a second encryption of the video stream. In various implementations, system 102 replicates the video stream after the first encryption. System 102 then performs a second encryption on each instance of the video stream based on the remote node to which each instance will be sent. As a result, each instance of the video stream has a common first encryption layer (e.g., first encryption layer 206) from the first encryption, and has a second encryption layer (e.g., second encryption layers 222, 224, 226) from the second encryption, where the second encryption layer is associated with a particular remote node. In other words, in various implementations, system 102 adds at least two layers of encryption layers (e.g., encryption layers 206, and encryption layers 222, 224, and 226) by performing the first encryption, the second encryption, etc. at the source node.

As indicated above, system 102 performs a second encryption of a video stream separately for each remote node 212, 214, and 216. In various implementations, system 102 generates a second key associated with the second encryption. System 102 then sends the second key from source node 204 to one or more remote nodes 212, 214, and 216. In various implementations, system 102 sends the second key from source node 204 to remote nodes 212, 214, and 216 via secure channels.

As a result, the video stream has a common first encryption layer 206 across multiple remote nodes 212, 214, and 216, and the video stream has a different second encryption layer (e.g., second encryption layers 222, 224, and 226) for each of different remote nodes 212, 214, and 216.

As indicated above, system 102 distributes live streaming to many users over various remote nodes 212, 214, and 216, each of which replicates the live streaming using a cascading server to achieve a log(n) algorithm. As shown in FIG. 2, source node 204 is a common node to multiple video streams.

In block 306, system 102 performs a fan-out of the video stream to remote nodes 212, 214, 216. As indicated above, in some implementations, the video stream arriving at each remote node has a common first encryption layer (e.g., common to the first encryption layer of the video stream arriving at the other remote nodes) and has a unique second encryption layer (e.g., unique to each remote node).

In block 308, system 102 enables one or more remote nodes 212, 214, and 216 to decrypt the second encryption layer. In other words, each remote node removes the second encryption layer and leaves the first encryption layer. In various implementations, remote nodes 212, 214, and 216 are not able to decrypt the first encryption layer, because each remote node has only a unique second key to decrypt the second encryption layer associated the given remote node. In other words, each remote node does not have the first key to decrypt the first decryption layer. As such, even if a given remote node has been compromised (e.g., by a third party), the content of the media stream is still protected by first encryption layer 206. Also, each remote node does not have other second keys to decrypt other respective second layers associated with other remote nodes. This increases security of the overall encryption scheme.

In some implementations, system 102 causes each of the remote nodes 212, 214, and 216 to replicate the video stream after their respective second encryption layer are decrypted. As indicated above, system 102 causes one or more of the remote nodes 212, 214, and 216 to fan-out the video stream after the second encryption layer is decrypted. At that point of fan-out, the video streams that are sent to the end-user nodes 232, 234, and 236, and have one common encryption layer 206.

In block 310, system 102 enables one or more end-user nodes 232, 234, and 236 to decrypt the first encryption layer. In other words, each end-user node removes the first layer of encryption. The first encryption layer decreases or eliminates the risk of compromise during the "last mile" between the remote nodes 212, 214, and 216 and the end-user nodes 232, 234, and 236. The "last mile" can be any distance. For example, in an example of a company meeting where an end-user is in a hotel room viewing a live video stream, implementations described herein ensure that the content cannot be intercepted by a competitor in an adjacent hotel room.

Implementations described herein provide various benefits. For example, implementations described herein provide secure broadcasting of media streams in a network system such as in a social networking environment. Implementations provide a combination of multiple encryption layers, which ensures secure delivery of sensitive media content via multiple fan-out locations around the world. Implementations enable many users around the world to securely view live events such as live video streams.

While various implementations are described herein in the context of two encryption layers, these implementations and other may also apply to three or more encryption layers (e.g., each associated with a corresponding tier of nodes). Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

While various implementations are described herein in the context of video streams, these implementations and others may also apply to other types of media streams. For example, such media streams may include audio streams.

Figure 4:
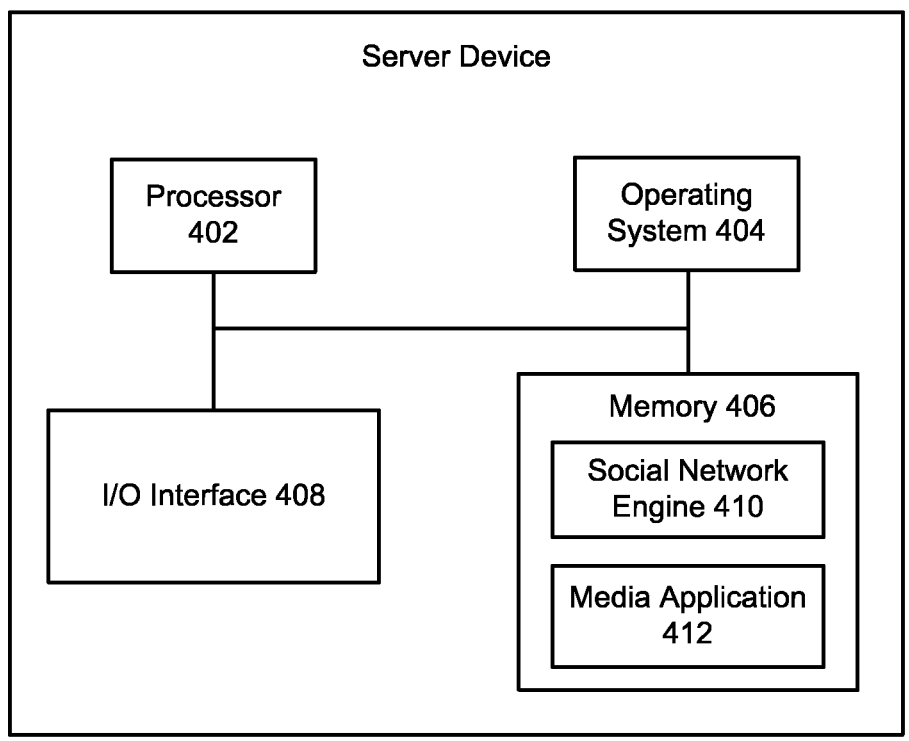
FIG. 4 illustrates a block diagram of an example server device, which may be used to implement the implementations described herein.

FIG. 4 illustrates a block diagram of an example server device 400, which may be used to implement the implementations described herein. For example, server device 400 may be used to implement server device 104 of FIG. 1, as well as to perform the method implementations described herein. Furthermore, one or more server devices 400 may be associated with each node described herein (e.g., source node, remote nodes, etc.) in order to carry out the implementations described herein. In some implementations, server device 400 includes a processor 402, an operating system 404, a memory 406, and an input/output (I/O) interface 408. Server device 400 also includes a social network engine 410 and a media application 412, which may be stored in memory 406 or on any other suitable storage location or computer-readable medium. Media application 412 provides instructions that enable processor 402 to perform the functions described herein and other functions.

For ease of illustration, FIG. 4 shows one block for each of processor 402, operating system 404, memory 406, I/O interface 408, social network engine 410, and media application 412. These blocks 402, 404, 406, 408, 410, and 412 may represent multiple processors, operating systems, memories, I/O interfaces, social network engines, and media applications. In other implementations, server device 400 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A method comprising:
performing a first encryption of a video stream, wherein the video stream has a first encryption layer from the first encryption, and wherein the video stream is a live video stream;
performing a second encryption of the video stream, wherein the video stream has a second encryption layer from the second encryption, and wherein the first encryption and the second encryption are performed at a source node in a network system;
sending the video stream to two or more remote nodes to decrypt the second encryption layer, wherein the two or more remote nodes are stored on separate servers;
causing the two or more remote nodes to provide the video stream to one or more end-user nodes after the second encryption layer is decrypted; and
enabling one or more end-user nodes to decrypt the first encryption layer, wherein the one or more end-user nodes replicate the live video stream.

2. A method comprising:
performing a first encryption of a video stream, wherein the video stream has a first encryption layer from the first encryption;
performing a second encryption of the video stream, wherein the video stream has a second encryption layer from the second encryption;
sending the video stream to two or more remote nodes to decrypt the second encryption layer, wherein the two or more remote nodes are stored on separate servers and wherein the second encryption layer sent to the two or more remote nodes is unique for each of the two or more remote nodes;
causing the two or more remote nodes to provide the video stream to one or more end-user nodes after the second encryption layer is decrypted; and
enabling one or more end-user nodes to decrypt the first encryption layer.

3. The method of claim 2, wherein the video stream is a live video stream.

4. The method of claim 2, wherein the first encryption and the second encryption are performed at a source node in a network system.

5. The method of claim 2, wherein the two or more remote nodes are not able to decrypt the first encryption layer.

6. The method of claim 2, wherein the two or more remote nodes replicate a live video stream after the second encryption layer is decrypted.

7. The method of claim 2, further comprising causing the two or more remote nodes to fan-out the video stream after the second encryption layer is decrypted.

8. The method of claim 2, further comprising:
generating a second key associated with the second encryption; and
sending the second key to the two or more remote nodes.

9. The method of claim 2, further comprising:
generating a first key associated with the first encryption; and
sending the first key to the one or more end-user nodes.

10. The method of claim 8, further comprising:
sending the second key from the source node to the two or more remote nodes via secure channels; and
enabling the two or more remote nodes to decrypt the second encryption layer using the second key.

11. The method of claim 9, further comprising sending the first key from the source node to the two or more end-user nodes via a secure channel; and
enabling the end-user node to decrypt the first encryption layer using the first key.

12. A system comprising:
one or more processing device; and
logic encoded in one or more non-transitory media for execution by the one or more processing devices and when executed operable to perform operations comprising:

performing a first encryption of a video stream, wherein the video stream has a first encryption layer from the first encryption;

performing a second encryption of the video stream, wherein the video stream has a second encryption layer from the second encryption;

sending the video stream to two or more remote nodes to decrypt the second encryption layer, wherein the two or more remote nodes are stored on separate servers and wherein the second encryption layer sent to the two or more remote nodes is unique for each of the two or more remote nodes;

causing the two or more remote nodes to provide the video stream to one or more end-user nodes after the second encryption layer is decrypted; and enabling one or more end-user nodes to decrypt the first encryption layer.

13. The system of claim 12, wherein the video stream is a live video stream.

14. The system of claim 12, wherein the first encryption and the second encryption are performed at a source node in a network system.

15. The system of claim 12, wherein the two or more remote nodes are not able to decrypt the first encryption layer.

16. The system of claim 12, wherein the two or more remote nodes replicate a live video stream after the second encryption layer is decrypted.

17. The system of claim 12, wherein the logic when executed is further operable to perform operations comprising causing the two or more remote nodes to fan-out the video stream after the second encryption layer is decrypted.

18. The system of claim 12, wherein the logic when executed is further operable to perform operations comprising:

generating a second key associated with the second encryption; and sending the second key to the two or more remote nodes.

19. The system of claim 12, wherein the logic when executed is further operable to perform operations comprising:

generating a first key associated with the first encryption; and sending the first key to the two or more end-user nodes.

20. The system of claim 18, wherein the logic when executed is further operable to perform operations comprising:

sending the second key from a source node to the two or more remote nodes via secure channels; and enabling the two or more remote nodes to decrypt the second encryption layer using the second key.

* * * * *